March 14, 1950     J. P. SERRELL     2,500,712
MULTIPLE COMBUSTION UNIT PULSE JET ENGINE
Filed March 5, 1946     6 Sheets-Sheet 1
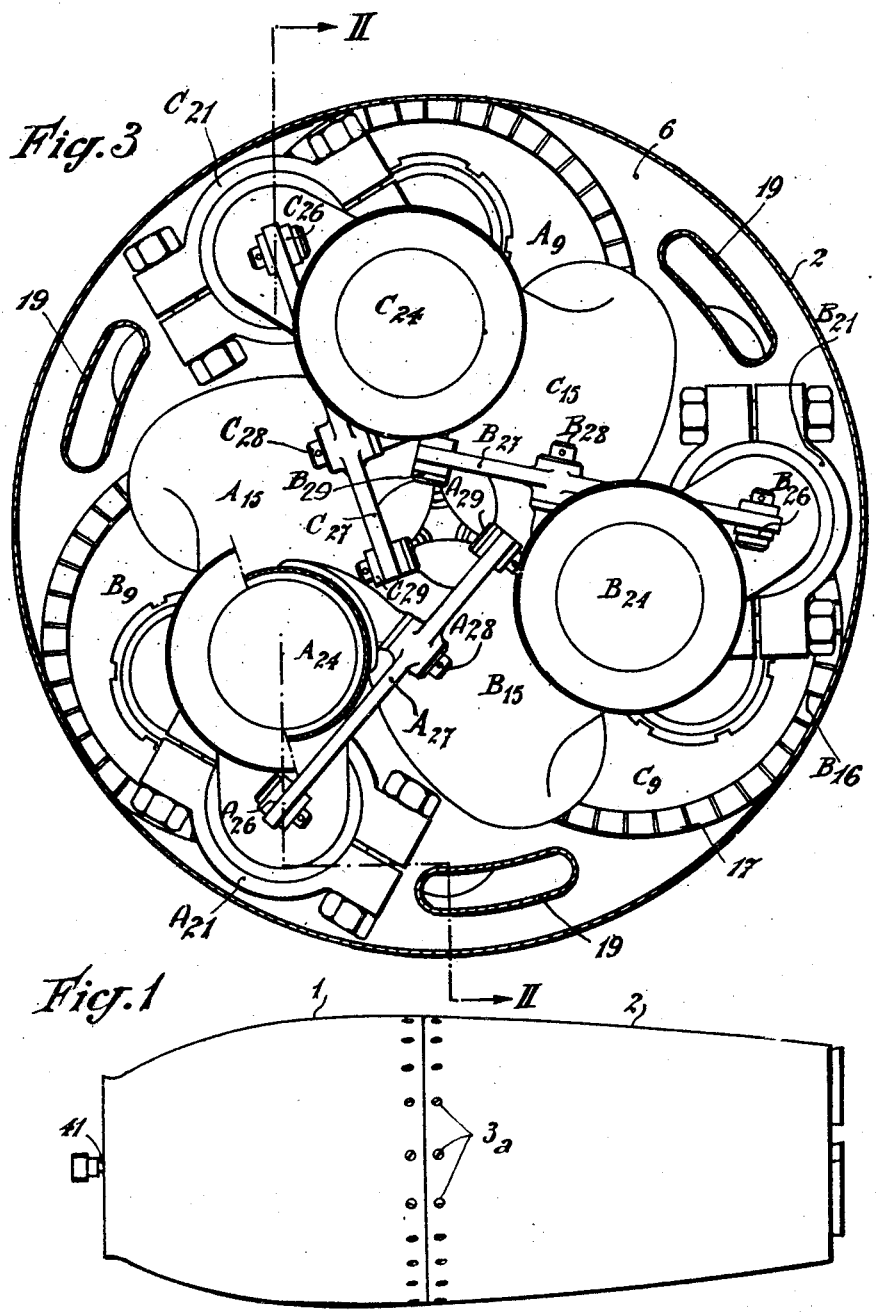
Inventor:
Jesse Pound Serrell
By: Watson, Cole, Grindle & Watson
Attys.

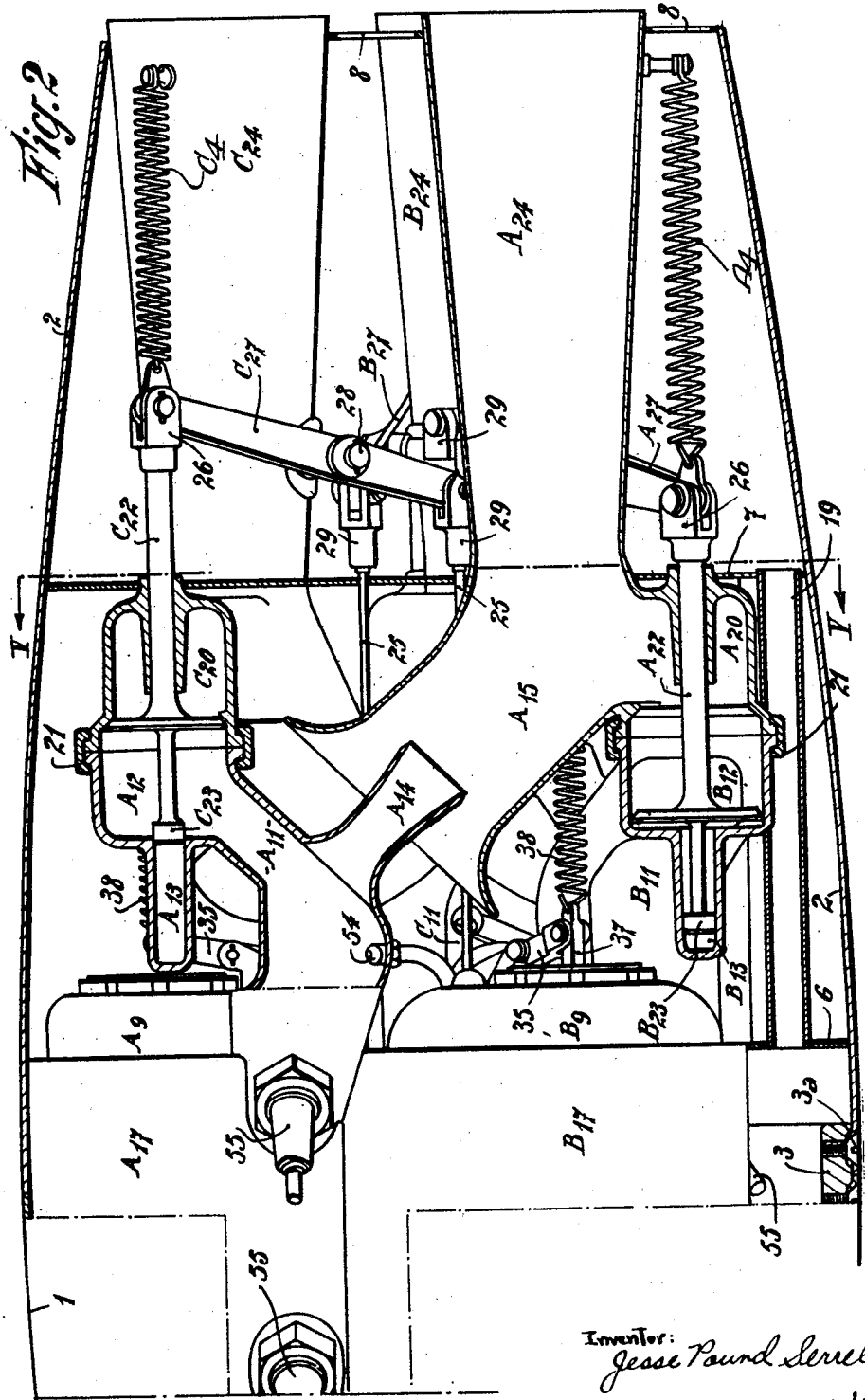

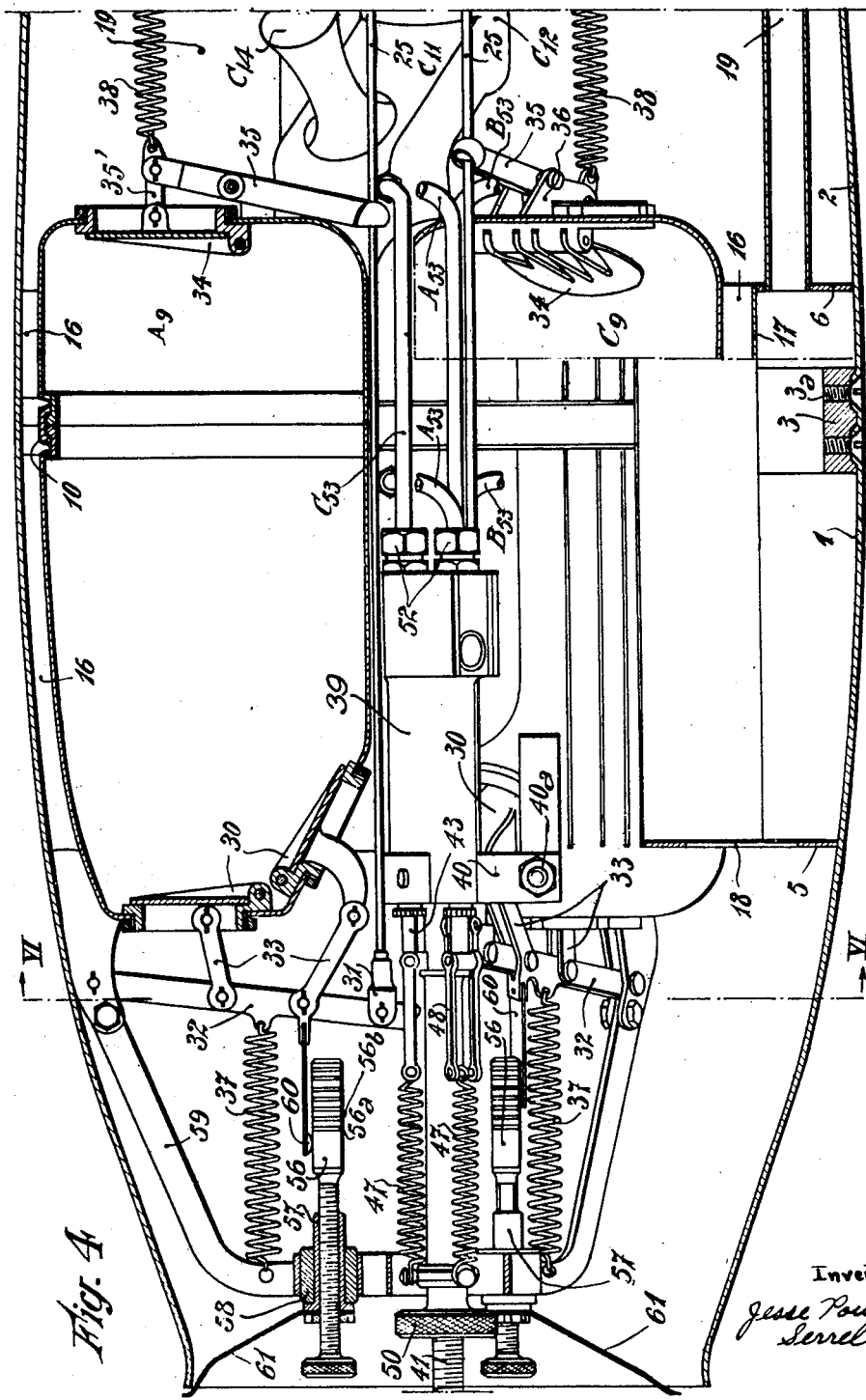

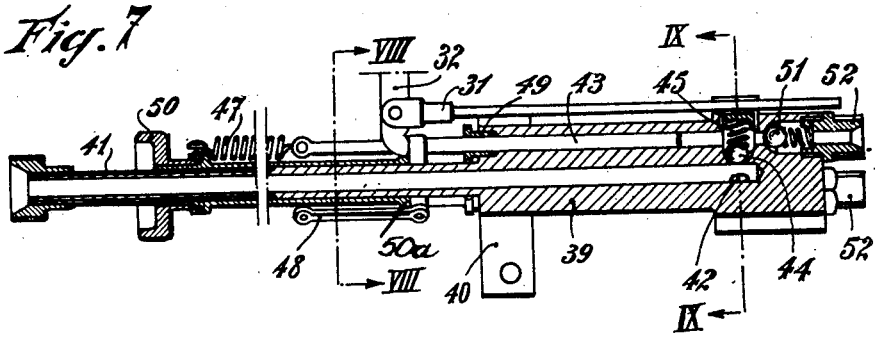
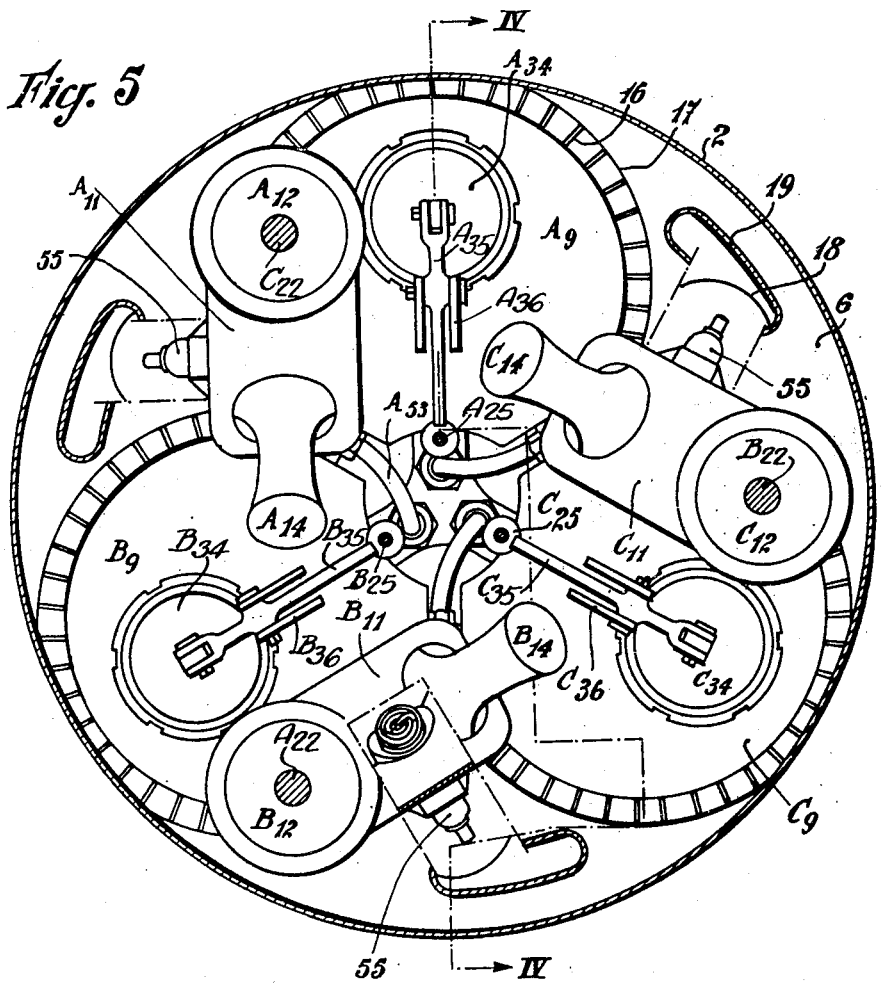

March 14, 1950  J. P. SERRELL  2,500,712
MULTIPLE COMBUSTION UNIT PULSE JET ENGINE
Filed March 5, 1946  6 Sheets-Sheet 5

Inventor:
Jesse Pound Serrell
By: Watson, Cole, Grindle & Watson
Attys.

March 14, 1950  J. P. SERRELL  2,500,712
MULTIPLE COMBUSTION UNIT PULSE JET ENGINE
Filed March 5, 1946  6 Sheets-Sheet 6
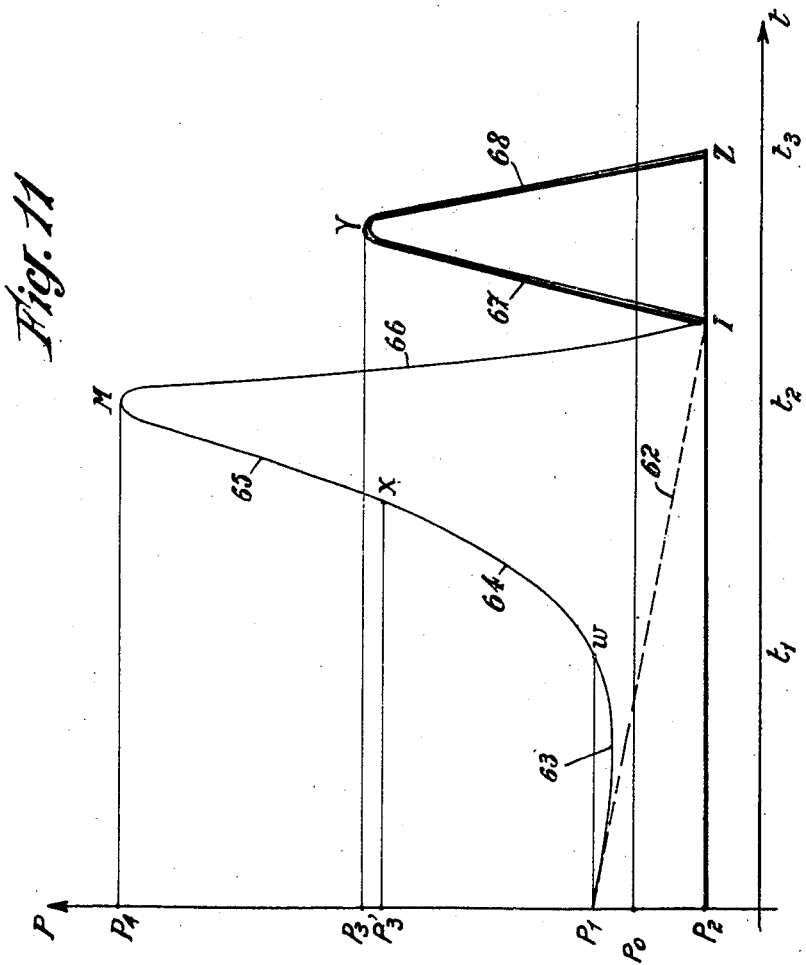

Patented Mar. 14, 1950

2,500,712

UNITED STATES PATENT OFFICE 2,500,712

MULTIPLE COMBUSTION UNIT PULSE JET ENGINE

Jesse Pound Serrell, Paris, France

Application March 5, 1946, Serial No. 652,180
In France June 7, 1945

19 Claims. (Cl. 60—35.6)

My invention relates to improvements in aircraft propulsion and has for its principal object the provision of a jet propeller for far greater general efficiency and superior in several respects to any with which I am familiar.

My invention is a pulse jet air propeller designed with a view to overcoming the objections above noted, and providing for aircraft travelling at speeds even greater than sound velocity in air.

A main object of the present invention is to provide a good thermodynamic efficiency by a proper precompression being obtained without use of pistons or revolving compressors, but by impulse of gases against gases, acting in the way of a ram. The rate of pre-compression thus given by what will be described as a jet pump or injector, is similar to that of a good internal combustion gas engine.

Still another object is to increase the thermodynamic efficiency in providing means for recovering the heat which is usually wasted or lost in ordinary combustion engines through radiators or air cooling devices.

A further object is to provide a high propulsive efficiency in increasing the mass of ejected gas by addition of air, and accordingly reduce ejection velocity, which is carefully selected to be in right proportion with specified travelling speeds of aircraft.

Still another object of this invention is to produce a very powerful take-off reaction, and thereafter considerably reduce fuel consumption for long distance travelling.

In contradistinction to a screw propeller, the general efficiency of my pulse jet propeller increases with travelling speeds of aircraft, abating time and costs by flight at very high speeds in proper altitudes.

Furthermore, while the rate of pre-compression in a rotating system is limited by centrifugal stress, in my invention pre-compression is not subjected to any mechanical rotating device, as it arises from a gas impulse which improves with the travelling speed itself.

In addition to these objects applied to aircraft propulsion, still another object is to provide a thermodynamic compressor of high efficiency to drive any power units such as turbines, helicopters, self-acting screw propellers and the like.

Together with the features of extreme lightness, simple and unexpensive structure, high thrust per surface unit and absence of rotating parts, pistons or other mechanical moving members except valves or flaps with their connections, fuel pumps and ignition contacts, other objects of this invention are attained and will be apparent after reading the subjoined specification of one embodiment thereof, when taken in connection with the attached drawings wherein similar letters and numbers of reference indicate like parts throughout the several views:

Fig. 1 is an external view of a propeller in accordance with this invention

Fig. 2 is a longitudinal view with parts broken away and cross section taken along the stepped line II—II on Fig. 3.

Fig. 3 is a rear end axial view with partitions removed in order to show more important members.

Fig. 4 is part of a longitudinal view with cross-sections taken along the stepped line IV—IV on Fig. 5.

Fig. 5 is a middle axis view with parts broken away and propeller members removed in order to show other parts, with cross-sections taken along the line V—V on Fig. 2.

Fig. 7 is a longitudinal view of the fuel pump with cross-sections taken along the line VII—VII on Fig. 8.

Fig. 11 is a diagram showing in time function the different pressures developed in the machine while in operation.

Figure 6:
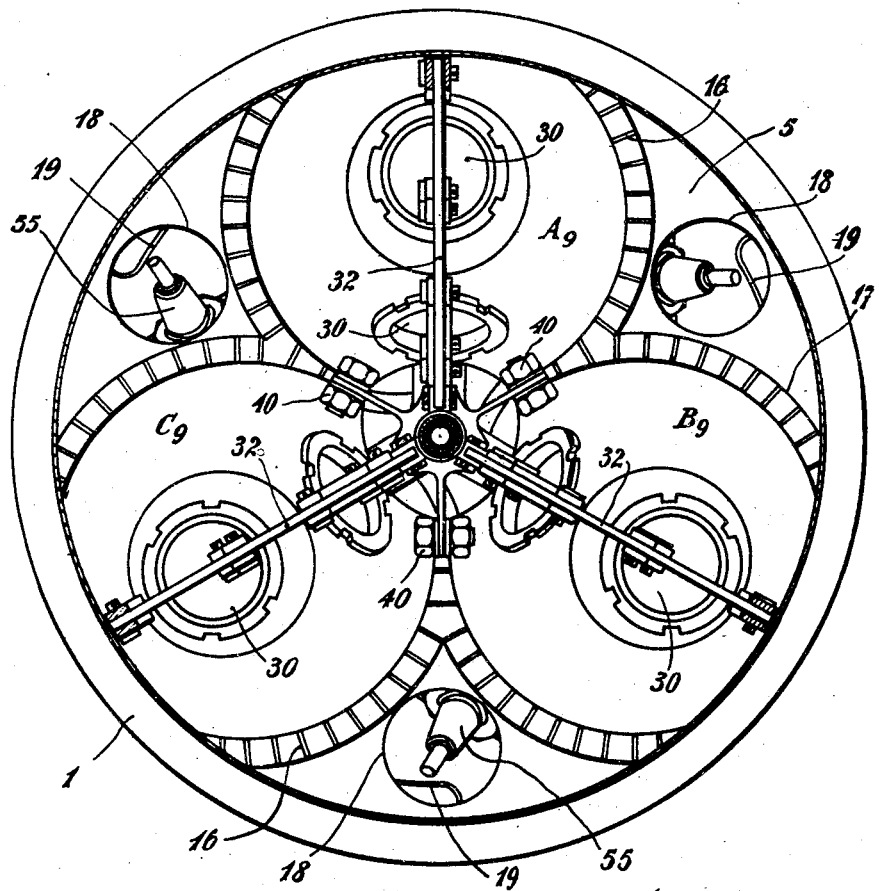
Fig. 6 is a front axis view with cross-sections taken along the line VI—VI on Fig. 4.

A pulse jet propeller made in accordance with the present embodiment of my invention (referring to the drawings from outside to center) comprises a streamlined body or covering in two parts 1, 2, fastened together with screws 3a on the segment 3 or in any other suitable manner. Partitions are provided to divide the inside into four different sections: the ante-chamber up to partition 5; between this and partition 6 are the thermopressure units; between partitions 6 and 7 is the collecting-chamber and partition 8 is a support.

The thermo-pressure units, being three in number in the present instance, are identified by letters A, B, C, for clearness in the interlinking of the similar parts they are composed of; for the sake of convenience, letters A, B, C have been marked on the drawings as follows: each component part is identified by a reference character, say 9 to denote a combustion chamber, but wherever it is necessary for avoiding confusion, to make apparent that one of the three thermo-pressure units, in which the component part under consideration is present, such reference character is preceded by the identification letter of said unit, for example, the combustion chamber in unit A is denoted A9. There are three combustion-chambers 9 made of thin sheet metal 10 having a high heat and stress resistance. They are made in two parts, assembled together by a collar 10 (Fig. 4) with bolts or screws (not shown) or in any other suitable and airtight manner. The combustion chambers have an extension or neck 11 of rectangular rounded cross-section, leading to a cylindrical piston-valve box 12 with a dash-pot 13, Fig. 2. It will be noticed that these extensions, in connection with their chambers are placed in a special position as will be more fully explained further.

On the neck of each extension, and at right angles to the neck, are placed the nozzles or jets 14. These are the exhaust nozzles through which combustion products from each combustion chamber are ejected into the cylindrical bodies 15, operating as jet pumps or injectors. According to this invention, the nozzles are not only convergent, but are also provided with a carefully calculated divergent section in order to insure highest expansion and velocity of ejected gases. And also according to the invention, bodies 15 of injectors or jet pumps are cylindrical or have a shape and volume calculated to ensure a maximum pressure inside the bodies before final ejection, since gases will be passed from each body into the combustion chamber of another unit to produce precompression therein as will hereinafter be explained, and obviously it is desirable to set up as high a precompression as possible.

The combustion chambers are provided with cooling fins 16, included in jackets 17. All air inside these jackets and the central passage between combustion chambers, is delivered to the collecting chamber. But air passing around the jackets and entering through holes 18 in partition 5 is carried beyond the collecting chamber through pipes 19 and escapes through holes in partition 8; it has therefore no cooling effect on the combustion chambers, and takes no part in the thermodynamic circuit. The objects of these separate passages are threefold: firstly to cool the spark plugs, secondly to give passage to electrical wiring, thirdly to reduce as much as possible aerodynamical drag, as clean-up tests in wind-tunnel may reveal.

The cooling air surrounding combustion chambers and entering the collecting chamber is designated as diluting air. Besides cooling, this diluting air provides for three other important objects: in the first place, being drawn in the bodies 15 by jet pumps or injectors 14 each in turn and one immediately after the other, it provides for pre-compression in one combustion chamber during time of ejection in another combustion chamber. For this purpose each body 15 leads to a by-pass 20 connecting a one-way passage for compressed mixture of gas and air injected by one chamber to another, through boxes 12 and necks 11. As the necks 11 are at right angles to the nozzles 14, it is known that the ingressing compressed gases will not escape through these nozzles before pressure in the chambers is equal to above-stream pressure. The by-passes 20 are fastened to boxes 12 by bolted collars 21 and they hold and guide piston-valves 22. Under impulse of compressed gases, piston-valves 22 move forward up to a certain distance, acting like a piston, giving but little or no passage to the gases. Then during the remainder of stroke, they open the flow, which is deflected and directed into the necks 11, as already said above at right angles to the nozzles 14, providing for kinetic obturation of the latter while operating pre-compression in the combustion chambers. The small pistons 23 slacken the movement and, together with springs 4 they throw the piston valves 22 back to closed position. In the second and third places, diluting air provides for increasing to the best advantage the weight or mass of compressed air ejected through the jet nozzles 24 and accordingly, ejection velocity is reduced.

It is well known that very hot gases at an originally high pressure are ejected at a velocity quite out of proportion to the travelling speed of a rather slow aircraft for the best propulsive efficiency. But on the other hand, it is well known also that high thermodynamic efficiency requires high pre-ignition and combustion pressures. Therefore the best general efficiency obtainable is provided by my invention in setting fixed ratios of diluting air to combustion gases, carefully designed to suit specific purposes such as more air for heavy propulsive thrusts when travelling well under sound speed, and less air for light aircraft travelling above sound speed. In connection with these purposes the passages for a certain ratio of diluting air around the combustion chambers are calculated to provide for the entrance of air, just after leaving the ante-chambers, at the same velocity as the travelling speed of the aircraft. As air is drawn in the collecting chamber by jet pumps it is accelerated by heat taken off surfaces of the combustion chambers, and the size of channels around said chambers is calculated to provide an isothermal expansion of said air, or in other words acceleration at constant temperature. As regards jet nozzles 24, it will be readily understood that while they eject the total weight of air passing through collecting chamber (including diluting, pre-compression, scavenging and motive gases), cross-sections of throats are carefully calculated to secure proper above-stream pressure; the angles and length of nozzles are also designed to secure highest expansion and velocity of gases during the drops from above stream pressure to rear pressure prevailing outside, which is so much below atmospheric pressure as travelling speed of an aircraft is greater.

A further use of piston-valves 22 is to drive all the mechanically moving parts of my machine. To this effect they are connected with traction rod 25 by cross-heads and pins 26 acting through a slot on the levers 27 which are carried on pivot-pins 28 and have cross-heads and pins 29 at the other ends.

Corresponding with opening stroke of piston valves 22 given by impulse of pre-compressing gases from jet pumps, there is a positive stroke on the inlet flaps 30 through rods 25, cross-heads and pins 31, levers 32 and connecting-rods 33. There is also at the same time, and given by the same piston valve, a positive opening stroke on outlet or scavenging flaps 34, through ball ended levers 35 on brackets 36 and connecting rods 35'. Closing of inlet flaps is effected by springs 37 and closing of outlet flaps by springs 38.

In this connection, it will be pointed out that rods 25 with the balls fast thereon pass freely through the socket ends of levers 35 so that when the upper rod 25 for instance is moved to the right (referring to Fig. 4), lever 35 is swung to open flap valve 34 but when said rod 25 is quickly moved back to the left, the ball thereon disengages the socket end of lever 35, and flap valve 34 is restored more slowly on its seat by spring 38. While for the sake of a simpler showing, the connection between rods 25 and levers 32 has been illustrated as comprised by a forked member and pin 31, I do not restrict myself to such an arrangement.

Now one important object of my invention is to interlink the operations from each ejecting or driving unit, on the one hand to compress gases in another unit and on the other hand to exhaust gases in still another unit.

In the present instance, the driving unit shown in the drawings is A. Piston valve $A_{22}$ is opened by impulse from nozzle $A_{14}$ and unit B is being pre-compressed, while inlet and outlet flappers of unit C are opened by piston valve $A_{22}$ and C is being exhausted, scavenged and refilled with fresh air from the ante-chamber.

In turn, driving unit will be B. C will be compressed and A will be refilled.

The next impulse will be given by C. A will be compressed and B will be refilled.

It is therefore clearly set forth that in my invention scavenging and refilling, as well as pre-compression of gases before ignition are operated and accomplished by impulses from gases to gases, without the interference of any other mechanical devices such as piston-pumps or rotating compressors.

Figure 10:
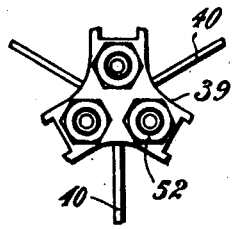
Fig. 10 is a rear axis view of the fuel pump.
Figure 9:
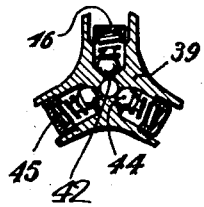
Fig. 9 is a rear axis view of the fuel pump with cross-sections along the line IX—IX on Fig. 7.
Figure 8:
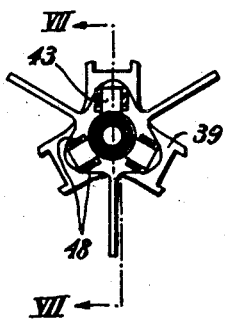
Fig. 8 is a middle axis view of the fuel pump with cross-sections taken along the line VIII—VIII on Fig. 7.

Fuel is fed to each combustion chamber during the itme of pre-compression in the same, by a multiple fuel-pump being also a part of my invention. An embodiment of this pump is shown in whole in Fig. 4 and details in Figs. 7, 8, 9, 10. In this instance it comprises a body of three cylinders 39 placed in central part between the combustion chambers and fastened thereupon by bolts $40a$. The central part of this body is a pipe 41, extending through the ante-chamber and connected to a suitable fuel tank (not shown). Apertures 42 are provided to lead fuel from this pipe to each cylinder and said apertures are kept closed during the positive feeding stroke of plunger 43 by special ball valves 44 with springs 45 and caps 46. One object of this pump is to provide large and fast delivery of fuel in the cylinders as well as a good fuel-tight closing. To this effect the balls are made of a soft as well as very light substance, such as synthetic rubber. As the plungers 43 are also very light, the pumps can be operated at high frequency of strokes, without involving too much inertia in moving parts. Fuel is drawn in each fuel cylinder in turn, by springs 47 through stirrups 48 (while it is discharged by lever 32 pushing plunger 43 as shown on Figs. 4 and 7) and still another object of this pump is to provide for a practically constant flow of fuel in the central pipe 41. While the feeding strokes of each plunger take place intermittingly there is practically no interruption in time between the discharges of each pump. Impact on moving fuel in central pipe behaves as a ram, facilitates fuel ingress and avoids cavitation.

Air-tightness is secured around the plungers by stuffing boxes 49, and exact quantity of fuel to be discharged at each stroke is measured by the adjustable sleeve 50, threaded on central pipe and having a shoulder $50a$ against the head of plungers, limiting the filling-stroke of same.

The right doses of fuel are discharged in combustion chambers, through discharge ball valves 51 (same as 44) connections 52, pipes 53 and one or several tips or nozzles 54 placed in the combustion chambers at best to ensure thorough and rapid mixture of fuel and air. In connection with this object, fuel nozzles are preferably placed in the stream of in-flowing pre-compression gases, which are quite hot and, in order still further to complete the mixture, it is provided to direct the necks 11 at such an angle with the chambers as above said, that will cause a strong whirl or turbulence inside said chambers. Being stated that the proper dose of fuel is discharged in each chamber in same time a pre-compression takes place in said chamber; on the drawings it is shown that fuel pump $B_{43}$ driven by piston-valve $A_{22}$ is feeding chamber B.

Ignition takes place in each chamber at the same time or very shortly after pre-compression and fuel feeding. One object of this invention is to provide for self and instantaneous ignition by projection of hot gases in a proper mixture of air and fuel during pre-compression of said mixture. But for starting purposes and while the machine is warming up, I use one or several ordinary spark plugs, for each chamber, placed in suitable positions such as 55. High tension is supplied to the plugs in the usual manner, by batteries and inductive coils (not shown), the primary windings of which are connected to metallic parts of the machine and insulated contactors 56. The contactors are threaded in sleeve nuts 57 to govern ignition advance or lag. Sleeve nuts are inserted in insulating sleeves 58 and fixed on frame 59. Spring blades 60 slide over the contactors at each stroke and make and break the primary current passing through wires 61. The object of this special contactor is to provide for several sparks in ignition plugs and therefore for a better and quicker ignition. In the drawings, ignition is operating in chamber B, caused by piston valve $A_{22}$. By carrying out the above outlined embodiments, it being understood that various changes may be made therein without departing from the spirit and scope of my invention, I am able to construct a very light, powerful jet propeller. Having a very small encumbrance, one object of this invention is to provide for a large surplus of power available for taking off and climbing purposes by the use of a number of separate units and to provide for cutting off any quantity of units during normal flying conditions.

I shall now summarize the thermodynamic operation and functions of this invention, in connection with the time-pressure diagram Fig. 11.

My ram-jet propeller operates by pulsations, the same as ordinary combustion engines, but without pistons. Frequency of pulsations is therefore much higher. Weight of gas ejected per chamber, per second, as compared with that from the cylinders of ordinary engines, will be in inverse ratio of momentum or inertia involved by mechanically moving parts. In view of this object, all moving parts in my invention are made strictly as light and small as possible, in order to ensure maximum frequency. Still further weight of ejected gas is completed by the fact that pre-compression is due to extra supply of gas in chambers, and not by reduction of volume.

As compared with rotating compressors in view of pre-compression it is to be noted that in my invention alternate pulsations require no expenditure of power whatever, while continuous pumping against continuous pressure requires an enormous expenditure of power, involving great and heavy machines. Furthermore, even at that expenditure, in the latter machines combustion has to take place at a pressure not higher than feeding pressure; of course pressures higher downstream than above-stream would check feeding; a rise in combustion pressure being therefore unobtainable, the efficiency remains poor. In my invention, combustion pressure is always far above feeding pressures and secures the best efficiency.

Thermodynamic cycle in my invention is compounded: combustion chambers operate in the usual four phase manner:

1. Scavenging and filling,
2. Pre-compression,
3. Combustion and maximum pressure,
4. Expansion and motive power.

But while these phases are ranged through four piston strokes in ordinary engines, in the present embodiment of my invention phases 2 and 3 are combined in one period, so as to have three periods of equal time-lengths which are simultaneously operated in three combustion chambers as follows:

1. Scavenging and filling (minimum pressure) one third of time,
2. Pre-compression, explosion (maximum pressure) one third of time,
3. Motive power ejection (maximum drops) one third of time. Each chamber being motive in turn, performs the other phases in chambers on either side.

With respect to jet-pumps or injectors, it will be noted that while pressure prevailing in the collecting chamber is designed to be below outside atmospheric pressure, in order to ensure a thorough and rapid refilling of combustion chambers, it is a well known fact that in bodies 15 when mixture of both motive and diluting gases takes place, pressure will rise to a maximum point depending on the quantity of energy displayed through impact of ejected gases, provided the shape and volume of bodies 15 do not allow expansion of mixture after impact. These bodies or mixing chambers are therefore to be considered as transformers of kinetic energy into heat and pressure through impact. Greatest heat and pressure are available in my jet pump bodies or mixing chambers, by reason of the fact that the total energy included in each particle of fuel, comprising also heat carried off to cool combustion chambers, is put to work at the best advantage.

It is well known that in theory the very best possible thermocycle comprises two adiabatics and two isotherms: a compression and an expansion in each form.

According to my invention, compounded thermocycle operates from inflow to final ejection in the following manner: dynamic pressure existing in the ante-chamber as a result of travelling speed is isotherm compression, if inflow velocity is equal to travelling speed of machine. The full line curve in Fig. 11 represents in time-functions, pressures developed on a certain quantity of air, entering combustion chambers through inlet flap valves. The dotted line curve shows in the same conditions, pressures developed in diluting air entering the collecting chamber after going through cooling jackets of combustion chambers. After mixture of both in jet pumps, gases go through pressures shown by double line curve. Atmospheric static pressure is represented by ordinate $p_0$. Static plus dynamic pressure involved in ante-chamber by speed is shown by ordinates $p_1$. At the origin of times, diluting air enters collecting chamber, expanded by suction from jet pumps, but kept at practically constant temperature by supply of heat from cooling jackets. This is the isotherm expansion part of thermocycle, as shown by dotted line 62, and accelerated air enters jet pumps at lowest pressure on ordinate $p_2$ at I; $p_2$ is practically constant in collecting chamber, as jet pumps operate one after the other without interruption.

On the other hand air enters combustion chambers while flap valves are opened through impulse of piston valve. Residual burnt gases are drawn out into collecting chamber and the scavenging flap valve is calculated to have a proper section in proportion with inlet flap valves in order to refill chambers with pure air at a pressure $p$, equal to pressure in ante-chamber. This is shown at W on part numbered 63 of full line curve, and these operations take place during one third of time period of the thermocycle.

During a certain fraction of time, between $t_1$ and $t_2$ pressure rises in combustion chambers up to $p_3$ on account of extra supply and pre-compression given by one of the jet pumps, and follows part of line numbered 64 up to point X, while a dose of fuel is pumped in and ignition takes place, either electrically or by heat of pre-compressing gas. A proper fuel will be chosen in order to provide the fastest combustion or rather instantaneous explosion than usual combustion as compared with engines. Pressure rises up to maximum $p_4$ at point M, following part numbered 65 of full line curve. Time extending from $t_1$ to $t_2$ being the second period of thermocycle (equal to the first) corresponds to adiabatic pre-compression of motive gases in combustion chambers.

During the third and last equal period extending from $t_2$ to $t_3$ several operations take place: at first total energy confined in combustion chamber at pressure $p_4$ is expanded in the nozzles of jet pumps. Pressure drops to I from highest $p_4$ to lowest $p_2$, following part numbered 66 of full line curve, involving adiabatic expansion and highest velocity (far above sound velocity) of motive gas from chamber. Scientists have found that in a properly built expansion nozzle or tuyère ejecting above sound velocity, the inner pressure after the throat and before impact is about half the outer pressure after impact.

In my jet pumps, a first impact takes place at point I of Fig. 11, drawing diluting air along line 62 as has been said, and driving gases are mixed with driven gases above sound velocity. But, as owing to the shape and volume of jet pump bodies, the mixture is not allowed further to expand, a second impact takes place causing a rise in temperature and pressure of mixture up to point Y, slightly above $p_3$ and following part numbered 67 of double lined curve.

This ensures adiabatic compression of total mixture including total energy, from which a small previous deduction is effected to correspond with and operate pre-compression $w$—$x$ along line 64 in second period of another combustion chamber. The compounded thermocycle is finally closed at best advantage in efficiency during adiabatic expansion from Y to Z on part numbered 68 of double lined curve while the most effective jet propulsion takes place owing to large increase in mass of gases, ejected at a velocity as best in proportion with travelling speed.

Furthermore, I have found by actual tests that suitable proportions of very hot gases and diluting air in view of the best general efficiency, also provide a very suitable cooling of combustion chambers and all other parts of my machine.

While I have described and shown what I deem to be efficient and reliable embodiments of my invention, I do not wish to be limited to the precise details herein set out. Thus for instance, while I have illustrated the means responsive to compressed mixture pressure for giving access to neck or extension 11 as a piston valve, it should be understood that I may select any other form for the same.

What I claim is:

1. In a machine of the type described, the combination of at least three separate internal combustion units each of which has an air inlet and a residual gas outlet; jet pump means operatively associated with each unit, adapted and arranged to receive each exhaust blast from said unit and to be operated thereby, said jet pump means having an air inlet passage to suck air, for producing a compressed mixed gas jet; passage means branching off from said jet pump means, for diverting a portion of said compressed mixed gas and forcing it into another of said units; valve means operatively associated with said air inlet and residual gas outlet, for opening the same simultaneously to cause scavenging and refilling air ingress through said inlet, and exit of residual gas through said outlet; and control means adapted to be operated from said compressed mixed gas for moving the valve means of still another unit to operative position.

2. In a machine of the type described, the combination of an internal combustion unit having an exhaust blast outlet; an air inducing, blast operated injector having an air intake passage on said unit at the exhaust outlet thereof, including an outer casing for guiding the incoming stream of air with the central stream of exhaust along a substantially straight direction; a second internal combustion unit; and a pair of passages connected to and branching off from the downstream end of said casing at angles less than 90° on either side of the axis of said casing, one of which is a one-way valved passage opening into said second unit while the other is an outwardly flaring exhaust nozzle.

3. In a machine of the type described, the combination of an internal combustion unit; means on said unit, including an air inducing, exhaust operated injector and an outwardly flaring nozzle, for producing a gas jet; a second internal combustion unit; passage means from the first-named means to said second unit, branching off from a point between said injector and said nozzle, for delivering a compressed exhaust gas and air mixture to said second unit; and a biassed-to-closing valve in said passage means, adapted and arranged to be moved to opening position by said mixture.

4. The combination of an open ended, elongated shell; at least three elongated combustion units accommodated in fore-aft direction within and forming a rigid assembly with said shell in mutual parallel relationship, with intervening clearance for passage of air, each unit having front and rear scavenging and refilling, valved openings; means extending backwards from the rear of each unit, including an air inducing, exhaust operated injector, for discharging exhaust from said unit as a high velocity jet of combustion gas and air mixture at the rear of said shell; means including a gas operated valve for diverting a portion of said mixture from a point of each exhaust discharge means located downstream with respect to the injector thereof, and feeding the same to another of said exhaust discharge means in a direction opposite to that of exhaust flow there-through and at a point upstream with respect to the injector of said other exhaust discharge means; and exhaust pressure sensitive means operatively associated with each exhaust discharge means for controlling the scavenging and refilling valved openings of the unit other than the unit corresponding to the last-named exhaust discharge means and the unit into the exhaust discharge means of which said last-named exhaust discharge means is arranged to feed a diverted portion of exhaust and air mixture.

5. In a machine of the type described, the combination of an internal combustion unit; means on said unit including an air inducing, exhaust operated jet pump and an outwardly flaring nozzle located downstream with respect to said jet pump, for producing a gas jet; a second internal combustion unit; passage means from the first named means to said second unit, branching off from a point between said jet pump and said nozzle and including a blind portion which has a valve seat at its inlet and is followed with a portion starting sidewise from said portion near the other end thereof, for diverting and delivering a compressed exhaust gas and air mixture to said second unit; and a biassed-to-closing valve movably supported and guided in said portion.

6. The combination of claim 5, which further comprises damping means for braking said piston valve as it is moved away from said valve seat.

7. The combination of claim 5, which further comprises a third internal combustion unit having air inlet and outlet apertures for scavenging and refilling purposes; scavenging valves movably supported from said unit, adapted to cooperate with said scavenging apertures; and means between said piston valve and said scavenging valves for controlling the latter from the former.

8. In a machine of the type described, the combination of three separate internal combustion units each of which has at least two separate apertures for inlet and outlet of scavenging and refilling air; means operatively associated with each unit, including an exhaust operated jet pump adapted and arranged for sucking outer air and an outwardly flaring nozzle located downstream with respect to said jet pump, for producing successively a compressed mixture of exhaust gas and air and a high velocity jet of expanded exhaust gas and air mixture; means branching off from the first named means relative to one of said units between said jet pump and nozzle thereof, for diverting a portion of said compressed mixture and feeding the same into another of said units; and biased-to-closing valve means for closing the scavenging and refilling air apertures of each unit, adapted to be moved to opening position by the exhaust blast from another unit; the arrangement being such that upon operation of one of said units, exhaust therefrom is in part derived to a second unit and in part ejected as a high velocity jet and causes scavenging in the third unit.

9. The combination of claim 8, which further comprises means for suppling fuel to each unit separately; and means adapted and arranged to be operated from the exhaust blast from said first unit, for operating the fuel supplying means of said second unit.

10. The combination of claim 8, which further comprises a fuel pump for each unit; a fuel delivery pipe from said pump, opening into the compressed mixture diverting means leading to said unit; and coupling means between the valve means of said third unit and the fuel pump for said second unit, for operating said fuel pump as said valve means moves to opening position.

11. The combination of claim 8, which further comprises a fuel pump for each unit; a fuel delivery pipe from said pump, opening into the compressed mixture diverting means leading to said unit; coupling means between the valve means of said third unit and the fuel pump for said second unit, for operating said fuel pump as said valve means moves to opening position; and means for self-refilling of each pump after each discharge of fuel therefrom.

12. The combination of claim 8, which further comprises a fuel pump having a plunger for each unit; means for delivering fuel from said pump to said unit; means, operatively associated with the valve means of said third unit, having a one-way connection with the plunger of the pump for said second unit, for moving the plunger as said valve means moves to opening position: and means for altering the operative stroke of said plunger.

13. The combination of claim 8, which further comprises an ignition plug in each unit; and means adapted and arranged to be operated from the exhaust blast from said first unit, for energizing the ignition plug in said second unit.

14. The combination of claim 8, which further compreses an ignition plug in each unit; means for energizing each plug separately; and means for controlling the plug energizing means for said second unit, from the valve means of said third unit.

15. In a machine of the type described, the combination of an elongated shell having a front opening and a rear cross partition; a plurality of elongated internal combustion units held in substantially parallel relationship within said shell, disposed in fore-aft direction with respect to the same at a distance therefrom so as to leave substantially unobstructed longitudinal air passages between said units and said shell, the rear portion of each unit being at a distance from said partition, thus providing a collecting chamber between said units and said partition, each unit having at least one front valved aperture and at least one rear valved aperture opening into said collecting chamber for scavenging purposes and means at the rear of each unit in communication with the same, including an exhaust operated jet pump, located in said collecting chamber and adapted to suck gaseous medium from said chamber, and an outwardly flaring nozzle which passes through said partition, for producing a high velocity gas jet.

16. The combination of claim 15, said shell being streamlined and said units having smaller cross dimensions in their forward portion than in the remainder so that said longitudinal air passages include tapering inlet portions.

17. In a machine of the type described, the combination of a plurality of internal combustion units; means providing an exit for exhaust from each unit; injector means following said exhaust exit means and adapted to be operated by exhaust, for sucking air and thus producing a compressed gaseous medium stream; and means providing both a normally closed, valved exit leading to another of said units and an unobstructed exit from said injector means, for said gaseous medium stream: the volume of said injector means being such as to cause at first a compression of the gaseous medium in spite of the presence of said unobstructed exit, and said unobstructed exit being so selected as then to cause an expansion of the gaseous medium stream therethrough.

18. In a machine of the type described, the combination of an internal combustion unit having an exhaust outlet; means fast with said unit, providing a passage which starts from said outlet then branches off at a distance from said outlet into an obliquely disposed, initially straight portion and a second, unobstructed portion at right angles to said straight portion; and means for feeding compressed gas mixture into said straight portion of said passage means at a point farther from said outlet than the branching off point.

19. The combination of claim 18, which further comprises biassed-to-closing valve means in said first portion of said passage means, located between said branching off point and said gas mixture feeding means, to provide a dead end for said passage first portion and prevent exit of exhaust gas therethrough, said valve means being adapted to be moved to opening position by compressed gas mixture pressure.

JESSE POUND SERRELL.

REFERENCES CITED

The following references are of record in the file of this patent:

UNITED STATES PATENTS

| Number | Name | Date |
| --- | --- | --- |
| 1,369,672 | Koenig | Feb. 22, 1921 |
| 1,375,601 | Morize | Apr. 19, 1921 |
| 1,739,255 | Niven | Dec. 10, 1929 |
| 1,856,552 | Hadamik et al. | May 3, 1932 |

FOREIGN PATENTS

| Number | Country | Date |
| --- | --- | --- |
| 299,420 | Great Britain | May 15, 1930 |
| 345,486 | France | Oct. 17, 1904 |
| 459,637 | Germany | May 9, 1928 |